May 3, 1949.  R. E. DUCE  2,468,816
PROCESS FOR MAKING COMPOSITE WELDED ARTICLES
Filed Jan. 4, 1946
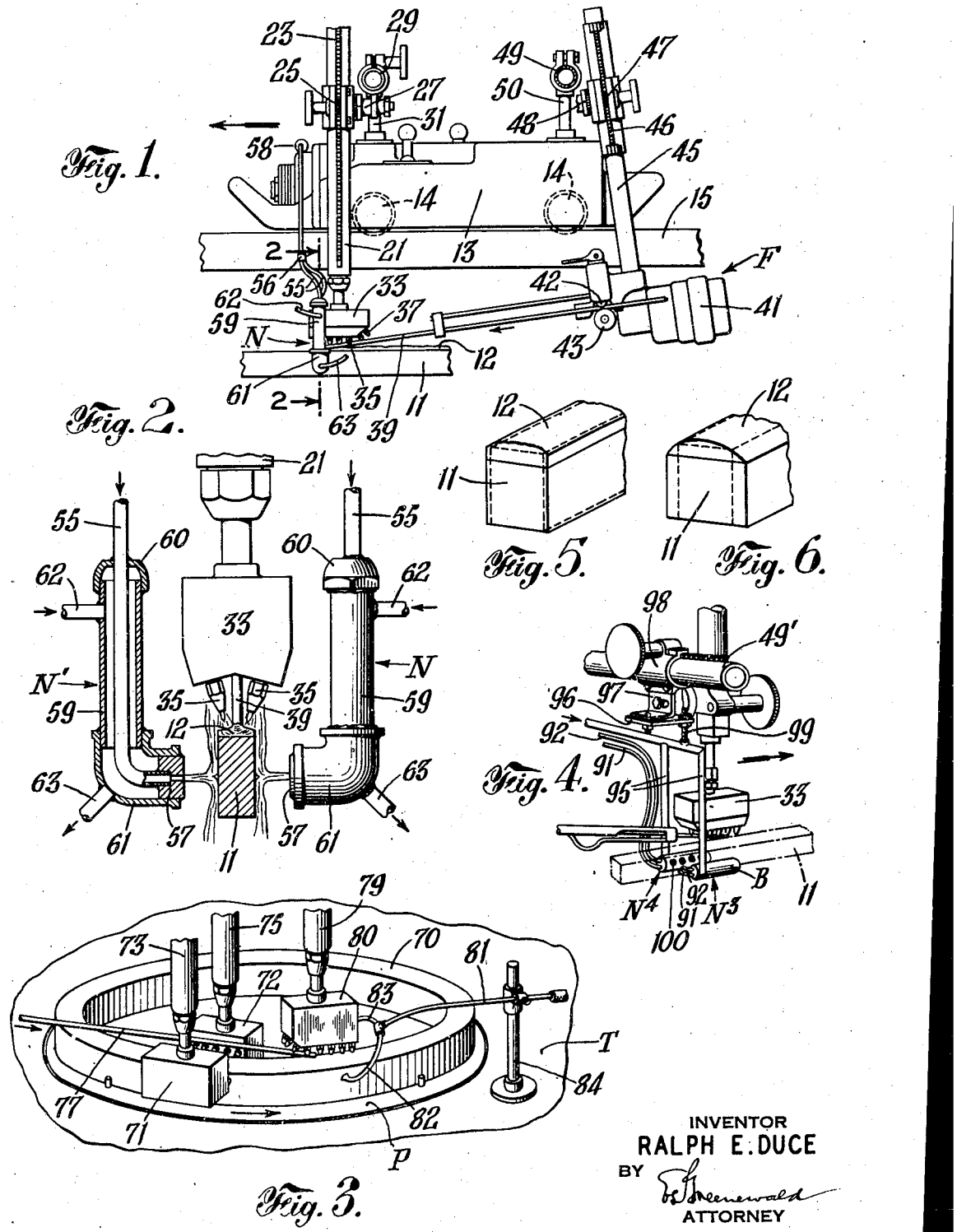
INVENTOR
RALPH E. DUCE
BY
ATTORNEY Patented May 3, 1949

2,468,816

UNITED STATES PATENT OFFICE 2,468,816

PROCESS FOR MAKING COMPOSITE
WELDED ARTICLES

Ralph E. Duce, Kokomo, Ind., assignor to Haynes
Stellite Company, a corporation of Indiana Application January 4, 1946, Serial No. 638,976

5 Claims. (Cl. 22—204)

This invention relates to the production of composite articles having surface layers of a protective metal united to a metal base to be protected, and to a novel process for effecting this result. It has especial utility for the production of articles having a hard oxidation- and wear-resistant surface layer composed of a protective alloy of the cobalt-chromium-tungsten type, although obviously other protective metals and alloys may be used with the invention.

The useful life of tools and workpieces such as shear blades, trimming dies, valve seats, etc. is prolonged by forming the working surfaces of a hard, wear-resistant alloy. Such surface layers are commonly applied to the workpiece by a fusion deposition method in which portions of a welding rod or pieces of the alloy are melted, and the molten metal flowed upon and welded to the workpiece by means of high temperature oxy-fuel gas welding flames directed upon the workpiece and upon the alloy. Heretofore when using this method it has been difficult to produce a smooth, even deposit of uniform thickness on the workpiece. Moreover, due to the limited machinability of the alloy, excess metal must be removed after the welding step by a machining or grinding operation which is slow and costly. Wear-resistant alloys of this type are relatively expensive, and it is desirable to limit the amount of such excess metal.

In the normal procedure of depositing a wear-resistant alloy layer upon a metal surface there is a tendency for either or both the leading margin and side faces of the molten alloy to flow over the "sweated" surface of the workpiece with a resultant forward or sidewise sloping of the peripheral contours of the deposited alloy. This tendency increases with the thickness of the deposited layer. When working close to an edge of the workpiece it is particularly troublesome, especially in mechanical deposition procedures, because of the tendency for the deposited alloy to overrun such edge.

Various procedures have been devised for obstructing these natural forces whereby a deposit of uniform thickness and controlled conformation can be produced during the actual welding operation. For example, a retaining wall or dam of refractory material may be constructed, or a die or mold made, whose inner surfaces are so shaped as to produce the desired contours when the layer is deposited against or within such dam, die or mold. Such a procedure is described in the Wissler Patent No. 2,250,561. In an alternative procedure the surface to receive the deposited metal is recessed to receive the latter, and the walls of such recess are removed by machining after the welding operation. This practice requires two machining operations, namely, the recessing of the workpiece, and the removal of the wall after deposition of the layer of surfacing metal. At times it has been more convenient to deposit the layer of wear-resistant metal upon an oversized workpiece and thereafter to machine away the top and side portions of the workpiece and overlay metal. However, this is uneconomical due to the loss of metal by machining, the time consumed in such operations, and the heat required for preheating the excess metal of the workpiece and for depositing the excess surfacing metal which must be removed later.

Among the more important objects of this invention are the following: to provide a novel method for producing upon a metal workpiece a smooth, even welded-on overlay of a protective metal or alloy; and to provide in novel manner, for producing a composite article having a welded-on overlay of a protective metal or alloy whereby a minimum of machining is required to complete the article in its final form, and the amounts of base metal and facing metal or alloy wasted are minimized, and welding heat is conserved. These and other objects will be apparent from the following description of the invention.

In the practice of the invention a surface zone of a metal workpiece is prepared to receive the protective metal by directing upon such surface one or more oxy-fuel gas welding flames to heat the metal of the workpiece to a welding temperature, while directing upon a body of the protective metal the same or similar welding flames to melt such metal and deposit it upon the heated surface of the workpiece. Preferably the proportions of the combustion-supporting gas and the combustible gas are such as to provide so-called carbonizing flames having reducing characteristics to prevent oxidation of the base metal and of the deposited metal. The molten protective metal flows over and is distributed upon the heated surface of the workpiece.

For preventing the molten overlay metal from flowing beyond the lateral margins of the workpiece, and for facilitating the formation of a welded-on deposit of metal which is approximately as thick at the lateral margins as at the mid-portion, a stream, jet, sheet, or flowing curtain of a cooling fluid, preferably of air or of an inert or non-combustible gas such as nitrogen, and preferably at room temperature or thereabouts, is directed to impinge upon the edge margins of the molten puddle of overlay metal, or upon the adjacent margins of the workpiece in manner to be deflected into contact with the molten protective metal at the margin of the molten puddle. By virtue of the force exerted upon the advancing metal of the puddle by the stream of air, and/or by the cooling effect of the latter upon the molten metal in contact therewith, the margins of the protective metal are frozen or solidified at the surfaces of contact with the cooling stream to form a solid wall behind which the main puddle of molten metal is retained during completion of the surfacing operation.

By adjusting the angle or direction of impingement of the air stream upon the lateral margins of the overlay metal to be immobilized, and by regulating the velocity and volume of the air stream, the contours of the lateral surfaces of the deposited metal can readily be controlled. The metal overlay shown in Fig. 5 of the drawing was made by the practice of the invention.

The specific form of apparatus employed depends upon the particular surfacing operation at hand and upon the shape and size of the workpiece being provided with a protective overlay. Similar factors also govern the pressure of the fluid, jet or stream employed, and the direction of its flow as it crosses the path of the flowing molten overlay metal at the margins of the workpiece.

It is necessary sometimes to provide water jackets or other means for cooling the air nozzles and associated apparatus where close proximity of such parts to the welding flames may otherwise cause injury thereto.

It generally is desirable that the air nozzle means be integral with or suitably mounted upon the torch means for providing the welding heat. Thus, these parts can be moved in unison to facilitate maintaining uniform operating conditions, insuring the deposition of uniform smooth layers of protective metal upon successive workpieces. However, this arrangement is not essential, and the torch means or equivalent heating means and the air nozzle means can be mounted for movement independently of each other.

While the fluid jet or stream can be directed so as to flow immediately into the path of the advancing margins of the molten overlay metal as the latter reaches the edges of the workpiece, it is preferred to impinge the fluid jet against a surface of the workpiece itself adjacent that having the deposited molten metal, in manner to cool portions of the metal of the workpiece underlying the overlay metal and thereafter to deflect the fluid along the surface of the workpiece and into the path of the advancing metal pool at the margins of the workpiece. This creates the equivalent of a moving wall of fluid, chilling and immobilizing the forward margins of the molten overlay metal along a generally vertical plane through the path of the fluid stream at the edges of the workpiece.

In the accompanying drawing wherein is illustrated certain modifications of the invention, Fig. 1 is a side elevation of one form of apparatus for carrying out the invention, parts being broken away, and other parts omitted;

Fig. 2 is an end view of the workpiece, torch head and air jets shown in Fig. 1, on a somewhat larger scale, parts being shown in section and other parts omitted;

Fig. 3 is a perspective view of another form of apparatus for carrying out the invention;

Fig. 4 is a fragmentary perspective view of still another form of apparatus for carrying out the invention, parts being broken away;

Fig. 5 is a perspective view of a workpiece having an overlay of protective metal provided in accordance with the invention, the final size of the machined workpiece being shown in dotted lines; and Fig. 6 is a perspective view of a workpiece having an overlay of protective metal made according to prior known processes, the final size of the machined workpiece being shown in dotted lines.

Referring now to Figs. 1 and 2, wherein is illustrated apparatus used with a particular application of the invention for depositing a welded-on overlay 12 of a protective alloy progressively upon one of the narrow sides of a steel bar ⅝ inch x ⅛ inch x 11 inches, the said bar 11 is secured in fixed position upon supports (not shown). A self-propelled carriage 13 of well-known type is mounted on wheels 14 for movement along a track 15, and is driven at a selected rate by an electric motor and associated parts (not shown) within the housing of carriage 13. Such a self-propelled carriage is shown and described in United States Patent No. 2,183,605 of J. H. Bucknam and A. J. Miller. It forms no part of the present invention.

Supported upon the carriage 13 is a welding blowpipe 21 having secured thereto a rack 23 engaging a pinion 25 carried by a bracket 27. The latter is mounted for sliding movement along a horizontal arm 29 which in turn is supported upon a standard 31 mounted on the carriage 13.

A welding head 33 of well-known type is connected with the blowpipe 21, and has groups of torch tips 35 and 37 directed respectively to discharge a combustible mixture upon the upper surface of the article 11 to receive the overlay and upon a welding rod 39 of the overlay metal. The latter is fed to the welding zone at a uniform selected rate as the welding proceeds by an automatic rod-feeding mechanism F driven by an electric motor 41 through a reduction gear and two pulleys 42, 43. Such a rod-feeding mechanism is described in United States Patent No. 2,301,763 of Robert L. Wagner. The rod-feeding mechanism is mounted on a support 45 having a rack 46 cooperating with a pinion 47 carried by a bracket 48. The latter is mounted for sliding movement along an arm 49 which is supported by a standard 50 secured to the carriage 13.

For directing streams of air upwardly along the lateral margins of the workpiece and into contact with the advancing molten overlay metal, and for insuring the production of an overlay of selected thickness which does not extend beyond the margins of the workpiece, two nozzle assemblies N, N' (see Fig. 2) respectively direct streams of air into contact with the lateral sides of the workpiece, and usually at right angles to the path of travel of the workpiece or torch. Commonly each stream of air impinges on the workpiece slightly forward of the leading pair of torch tips, and at an angle of elevation of approximately 5°, although the jets can be directed horizontally with good results in many instances (see Fig. 2), and other angles of elevation may be used.

In the form shown in Fig. 2, each air nozzle assembly includes a flexible air conduit 55 made of a metal such as copper. The discharge end of each conduit 55 is housed within a nozzle unit which comprises a tube 59, cap 60, elbow 61 and an orifice block 57 having an orifice passage with which the conduit 55 communicates. Water inlet and outlet lines 62, 63, are connected respectively with a source of water under pressure and with a point of discharge. The inlet end of each conduit 55 is connected with a header 56 which, with the conduits 55, is suitably supported as by a bracket 58 on the carriage 13. The header leads to a source of air or the like under pressure (not shown).

With the general type of apparatus illustrated in Figs. 1 and 2, it has been possible, using an air pressure of 6–8 pounds per square inch (gauge), to deposit on one narrow side of steel bars ⅝ inch x 1 inch x 11 inches an overlay of a wear-resistant alloy of cobalt, chromium and tungsten ⅛ inch thick to the very edges of the workpiece without overrunning the edges. The upper surface of the overlay was relatively flat. Heretofore this has not been possible in mechanical deposition procedures, nor even by manual deposition without resorting to multi-layer techniques which are known to be impractically slow.

In another modification of apparatus for carrying out the invention, shown in Fig. 3, a valve seat 70 is secured upon a platform P which is mounted for rotation at a selected rate about a vertical axis under the action of driving mechanism (not shown). A fixed table T surrounds the rotatable platform P. Two preheating torch heads 71, 72 have a plurality of tips directing a combustible gas mixture from blowpipes 73, 75, upon the uppermost portions of the side margins of the valve seat. A welding rod 77 of the overlay alloy is mechanically fed to the welding zone by means of rod-feeding mechanism (not shown) like that illustrated in Fig. 1. A welding blowpipe 79, having a torch head 80 similar to the head 33 of Figs. 1 and 2, directs welding flames upon the uppermost surface of the valve seat 70 to receive the overlay metal, and upon the welding rod 77. A flexible air header 81 of a metal such as copper is supported on a standard 84 mounted on the fixed table T, and has two branch lines 82, 83, directed to discharge streams of air from a source of air under pressure (not shown), upon the opposite lateral margins of the valve seat in an approximately horizontal plane at the welding zone beneath the torch head 80. Each branch line 82, 83, its discharge end shaped, sized and disposed to give the air streams the desired volume, velocity and direction. The blowpipes 73, 75 and 79 are suitably supported upon standards (not shown) carried by the fixed platform T for universal adjustment vertically and horizontally, as in the apparatus of Fig. 1.

In the operation of the apparatus of Fig. 3, the platform P is rotated at a fixed rate, and torches 73, 75 and 79 are lighted. When the metal of the valve seat beneath the torch 79 reaches a welding temperature the rod-feeding mechanism and air jets are actuated, and molten overlay metal is progressively fed to successive portions of the preheated surface as movement of such portions past the torches continues. Air impinges upon the lateral margins of the valve seat and is deflected upwardly to chill the workpiece metal in contact therewith and to provide a curtain of cooling fluid in the path of the molten overlay metal as it reaches the lateral margins of the workpiece. This instantly chills and immobilizes the flowing metal and prevents overrunning of the margins of the workpiece.

In the form of apparatus for carrying out the invention shown in Fig. 4, each of the two nozzle assemblies N³, N⁴, made of copper or other suitable metal or alloy, directs a plurality of generally parallel jets of air or other cooling fluid upon opposite lateral surfaces of the workpiece adjacent the points where the flowing deposit of the overlay metal reaches the lateral margins of the surface being coated. The nozzle block B of each assembly N³, N⁴ has a passage for coolant water (not shown), provided with inlet and outlet lines 91, 92, connected respectively with a source of water under pressure and with a point of discharge. Each nozzle block B has a longitudinal passage (not shown) for air or inert cooling fluid, the inlet of which is connected with a conduit 95 leading to a source of air or the equivalent under pressure. A plurality of spaced air discharge orifices communicate with the air passage of each block and direct streams of air or the like into contact with the lateral sides of the workpiece at approximately 90° to the path of relative movement of the torch head and the workpiece. Usually the air is directed in parallel streams from these orifices, although in certain instances it may be desirable to discharge the air in converging streams or in diverging streams. Preferably the air discharge orifices are provided with removable discharge tips 100. This facilitates cleaning of the tips where necessary, and the ready substitution of tips having any desired air orifice size and length as required. The multiple orifices insure the presence of an air stream of suitable characteristics at all points where the flowing molten metal reaches the sides of the workpiece, even in instances where the surfacing operation is conducted at high rates of speed, or where variations in the application of heat or in the quantity of overlay metal being deposited occur during the operation. Such arrangement also permits the effective use of lower air velocities to effect the desired purpose, and permits wider variations in the air pressure employed without interfering with the effectiveness of the operation.

The nozzle assemblies and associated conduits are supported on an arm 49' corresponding to the arm 49 of Fig. 1 by means of interassociated plate 96, angle member 97, a bracket 98, and a threaded rod 99 provided with lock nuts. The arrangement is such that the two nozzle assemblies may be moved vertically as a unit and locked in adjusted position by cooperation of the plate 96 and threaded rod 99 and lock nuts.

For adjusting the nozzle assemblies longitudinally of the workpiece a stud carried by angle member 97 extends through the slot in plate 96. This arrangement permits locking the plate and angle member in selected position longitudinally of the workpiece.

For moving the nozzle assemblies N³, N⁴ transversely of the workpiece and for locking the bracket member 98 and angle member 97 in selected position, a stud carried by the bracket 98 extends through an elongated slot in the vertical portion of the angle member.

By sliding plate 96 along the angle member longitudinally of the workpiece the two air assemblies may be moved as a unit toward or away from the torch head 33 in the direction of relative movement of the torch head and the workpiece during a surfacing operation. Similarly, by moving the angle member 97 with respect to the stud on bracket 98 both air assemblies are movable as a unit transversely of the work.

In certain instances, the surface receiving the overlay may have an undercut portion against which the air jets impinge. Here the principal effect of the air blasts appears to be the chilling of the workpiece metal at the welding zone, assisted in some degree by an induced flow of cool air across the path of the molten overlay metal at the lateral margins of the workpiece.

Figs. 5 and 6 illustrate composite articles having overlays of protective metal made respectively by the present process and by the commonly employed prior processes. The portions lying between the full lines and the dotted lines are those which must be removed in a finishing or machining operation. These figures clearly show that in this invention, much less base metal and overlay metal must be heated to a welding temperature, and much less of each metal is lost in the subsequent machining operations than in the prior procedure. This is of outstanding importance where the overlay metal is wear-resistant and is difficult and costly to machine.

It will be evident that the invention is not limited to the particular adaptations thereof herein disclosed, and that many departures may be made from the apparatus described while utilizing the principles of the invention. Thus, the air blast means may be integral with or detachably and adjustably mounted upon the welding blowpipe or the torch head, so that the two may be moved concurrently, whiles providing universal adjustment of the air blast means with respect to the torch head. Although two air jets are shown in the form of apparatus illustrated, it will be understood that a single jet, or a multiplicity thereof may be employed where found necessary or desirable.

When providing an overlay of protective metal upon a small surface such as the upper surface of the head of a poppet-type valve, an annular air header having a plurality of radially—or laterally—directed apertures for air jets may be used to direct air streams into contact with the lateral surfaces of the valve head.

When applying an overlay of protective metal upon the annular surface of a metal article of the type shown in Fig. 3, an annular air header or block somewhat similar to that shown in Fig. 4 may be employed, which surrounds the article and directs converging streams of air into contact with the outermost surface of the article. Concurrently an inner air header may discharge diverging streams of air into contact with the innermost lateral surface of the article. An annular torch head may discharge welding flames concurrently upon all parts of the upper surface of the article which has thereon the necessary amount of the surfacing metal to be melted and welded to such surface.

I claim:

1. Process for controlling the contour of a lateral margin of a welded-on overlay of a protective metal during the deposition of such overlay upon a metal article, which comprises feeding at least one molten body of a protective metal into contact with successive portions of a surface of an article to be provided with a welded-on overlay, while effecting relative movement between such surface and said body of protective metal and while heating said successive portions of the surface to a welding temperature at which the metal of the article is not substantially molten but at which the protective metal in contact therewith is molten, whereby the molten metal flows over and is intimately united with said surface, during such relative movement between said surface and said body, directing a flowing stream of a cooling fluid across the path of flow of the portion of the molten metal at a lateral margin of the surface of the article having thereon the molten overlay metal, while preventing substantial contact of said stream of cooling fluid with the free exposed surface of said molten metal remote from said margin, thereby chilling and immobilizing only those portions of the overlay metal in the path of said stream, said cooling fluid being selected from the class consisting of air, inert gases, and non-combustible gases, and continuing to flow molten metal upon successive portions of said surface of the article until a welded-on overlay of desired thickness is obtained which has approximately the same thickness at points adjacent the lateral margin of the surface of the article as at points remote from said margin.

2. Process as defined in claim 1 wherein the cooling fluid employed is air.

3. Process as defined in claim 1 wherein the cooling fluid employed is an inert gas.

4. Process for controlling the contour of at least one lateral surface of an overlay of a protective metal during the deposition of such overlay upon a metal article, which comprises feeding molten protective metal into contact with successive portions of a highly heated surface of such an article within a welding zone at said surface, thereby forming on the surface an overlay of the protective metal which tends to advance to and flow over the lateral margins of said surface and normally to have lateral sloping contours; and during the flow of such molten metal in contact with the surface of the article directing a stream of a cooling fluid upon a lateral margin of said article and transversely across the path of flow of the advancing molten metal at and adjacent said lateral margin while shielding from said stream the portions of molten metal remote from said margin, thereby shaping and immobilizing the forward surface of the advancing molten metal as it reaches the margin of the article while substantially eliminating marginal slope of the overlay metal, the said cooling fluid being selected from the class consisting of air, inert gases and non-combustible gases.

5. Process for controlling the contour of a lateral margin of a welded-on overlay of a protective metal during the deposition of such overlay upon a metal article, which comprises feeding molten protective metal into contact with successive portions of a highly heated surface of such metal article within a welding zone at said surface, thereby forming on said surface an overlay of the protective metal which tends to advance to and flow over the lateral margins of said surface and normally to have lateral sloping contours; and during the flow of such molten metal in contact with said surface of the article directing a stream of a cooling fluid upon a second surface of the article immediately adjacent said welding zone and thence deflecting such stream transversely across the path of flow of the advancing molten metal at said second surface while shielding from said stream the portions of molten metal remote from said second surface, thereby cooling portions of the said metal article underlying the overlay metal at said welding zone, and shaping and immobilizing the forward surface of the advancing molten protective metal as it reaches said second surface of the article while substantially eliminating marginal slope of the protective metal, said cooling fluid being selected from the class consisting of air, inert gases and non-combustible gases.

RALPH E. DUCE.

REFERENCES CITED

The following references are of record in the file of this patent:

UNITED STATES PATENTS

| Number | Name | Date |
| --- | --- | --- |
| 1,435,996 | Taylor | Nov. 24, 1922 |
| 2,147,367 | George | Feb. 14, 1939 |
| 2,168,581 | Pufahl et al. | Aug. 8, 1939 |
| 2,250,561 | Wissler | July 29, 1941 |
| 2,295,523 | Bucknam et al. | Sept. 8, 1942 |
| 2,323,974 | Bucknam et al. | July 13, 1943 |